(12) United States Patent
Winefordner et al.

(10) Patent No.: US 7,225,703 B2
(45) Date of Patent: Jun. 5, 2007

(54) BICYCLE PEDAL AND CRANK APPARATUS

(75) Inventors: Carl Winefordner, Laguna Beach, CA (US); Frank Hermansen, Laguna Beach, CA (US)

(73) Assignee: California Crank Brothers, Inc., Laguna Beach, CA (US)

( * ) Notice: Subject to any disclaimer, the term of this patent is extended or adjusted under 35 U.S.C. 154(b) by 373 days.

(21) Appl. No.: 10/802,105

(22) Filed: Mar. 16, 2004

(65) Prior Publication Data

US 2005/0204859 A1    Sep. 22, 2005

(51) Int. Cl.
*G05G 1/14*    (2006.01)
(52) U.S. Cl. .................................................. 74/594.4
(58) Field of Classification Search ................ 74/594.1
See application file for complete search history.

(56) References Cited

U.S. PATENT DOCUMENTS

| | | | |
|---|---|---|---|
| 4,080,017 A | 3/1978 | Meyer | |
| 4,882,945 A * | 11/1989 | Trevizo | 74/594.3 |
| 5,203,229 A | 4/1993 | Chen | |
| 5,440,950 A * | 8/1995 | Tranvoiz | 74/594.4 |
| 5,634,382 A * | 6/1997 | Fan | 74/594.1 |

* cited by examiner

*Primary Examiner*—Richard M. Lorence
*Assistant Examiner*—Edwin A. Young
(74) *Attorney, Agent, or Firm*—Leonard Tachner

(57) ABSTRACT

A pedal with a shaft fixed to the pedal body instead of a spindle that turns relative to the pedal body. The shaft is fixed relative to the pedal body. The pedal shaft rotates relative to the crank arm instead. A sealed cartridge ball bearing is mounted to the end of a crank arm and held in position by a retainer. The shaft is fitted through the sealed cartridge ball bearing of the crank arm and a screw secures the shaft in position. This changes the pedal to crank interface. The pedal does not require bearings or bushings or seals as with prior art pedals, because the shaft rotates within the sealed cartridge bearing held within the crank arm. The shaft and pedal body can be combined to create an even simpler pedal.

9 Claims, 6 Drawing Sheets

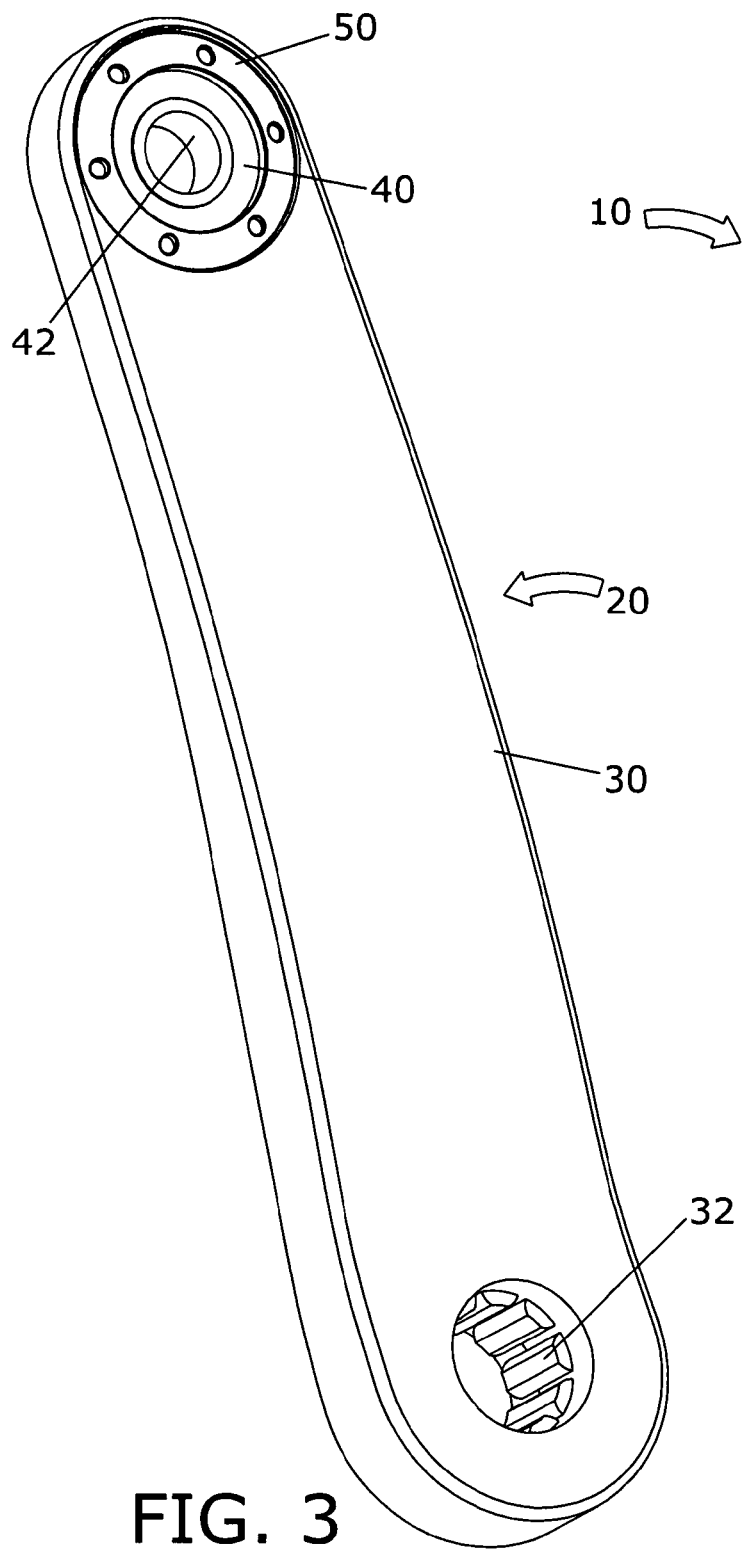
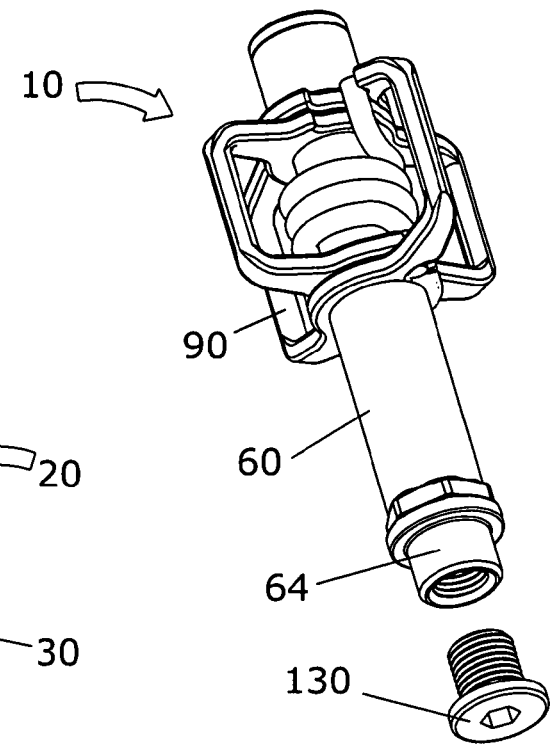
FIG. 3
FIG. 4

BICYCLE PEDAL AND CRANK APPARATUS

BACKGROUND OF THE INVENTION

1. Field of the Invention

The present invention relates generally to the field of bicycles and more particularly to an improved bicycle pedal and crank assembly.

2. Background Art

A number of pedal and crank designs have been made commercially available. Pedal designs include basic pedals and a variety of clipless versions for clamping shoes to pedals. Something that all pedals have in common is that they employ a spindle that is fixedly mounted to the crank arm, a pedal body that rotates about the spindle, and bearings or bushings between the pedal body and the spindle. The pedal spindle is always rigidly connected to the crank arm, usually by threading the spindle directly into the crank arm. The pedal spindle never turns relative to the crank arm.

Cranks typically have a threaded hole at the end of each crank arm for attaching the pedal spindle. Most cranks connect to a bottom bracket axle on the end of each arm opposite the pedal. The bottom bracket connects to the bottom bracket housing of the bicycle frame, and normally includes two or more bearings for the bottom bracket axle to turn. That way, the crank arms rotate smoothly relative to the bicycle frame. Some cranks have integrated the bottom bracket so that the bottom bracket axle is permanently connected to at least one of the crank arms. In some designs, this allows the bottom bracket axle to be made larger and the bearings to be moved outboard, stiffening the system, and/or reducing the system weight. In no cases is there a bearing incorporated into the pedal end of crank arms.

In bicycling, weight is extremely important because the power that a human produces is relatively small. Even small savings in weight can be extremely beneficial to racers and people who cycle long distances.

Pedals typically contain from 10 to 50 components. For example, a typical double side entry prior art clipless pedal, U.S. Pat. No. 5,203,229, has 39 components not including the cleat. Generally, clipless pedals contain more components than basic pedals because the mechanism for clamping onto a cleat usually adds parts. Generally, more components leads to higher costs and poorer performance in adverse environmental conditions.

Pedals are often used in extreme conditions. This is especially true because pedals are low to the ground and interface with the rider's shoe. Pedals are exposed to dirt, rain, mud, snow, and varying temperatures. Because of these factors, sealing the bearings and bushings from contamination is extremely important. Currently, because the seals are located on the pedal, they are in direct contact with the rider's shoes, which are often contaminated with dirt, mud, sand, etc.

For many pedals on the market, rebuilding the bearings and bushings is difficult or impossible for most consumers. Oftentimes, it is very difficult to access the bearings or bushing, and once accessed, it is often difficult to remove them. For pedals that use loose ball bearings rather than cartridge bearings or bushings, it is easy to lose the balls during disassembly, and nearly impossible to reassemble the balls and properly adjust the bearings. Most pedals that use loose ball bearings are realistically disposable rather than rebuildable.

Stack height is the distance between the bottom of the rider's shoe and the centerline of the spindles of their pedals. In order to lower the rider's center of gravity for better stability, it is preferable to have the lowest stack height possible. Currently, all pedals have at minimum a spindle, some form of bearings, and a body. The stack height is determined by adding these layers. U.S. Pat. No. 4,080,017 discloses one way to reduce stack height in a bicycle pedal, but at the expense of increasing Q-factor.

Q-factor is the distance between the center of the pedal body to the centerline of the bicycle. Essentially, Q-factor is a measure of how far the rider's feet are apart from each other. Q-factor is determined by a combination of the bottom bracket spindle length, the crank offset, and length of the pedal. Many bicyclists have a strong preference for the Q-factor depending on their leg length and their particular physiology. Most commonly, bicyclists can suffer from knee pain and damage if the Q-factor is too large.

SUMMARY OF THE INVENTION

The present invention provides a pedal for bikes, which has a shaft that is fixed in relation to the pedal body instead of a spindle that rotates in relation to the pedal body.

The present invention provides a pedal for bikes, which has no bearings or bushings for pedal body rotation.

The present invention provides a crank for bikes, which has a bearing or bushing for receiving a pedal shaft.

The present invention provides a pedal for bikes, which has fewer components than conventional bicycle pedals.

The present invention provides a pedal for bikes, which has improved contamination protection.

The present invention provides a pedal for bikes, which is less expensive to make than comparable conventional bicycle pedals.

The present invention provides a pedal for bikes, which has a lower stack height.

The present invention provides a pedal for bikes, which is stronger, which is easier to rebuild, which is more durable, which weighs less and which does not affect Q-factor adversely.

The foregoing and other advantages are attained, according to the present invention, by a pedal with a shaft fixed to the pedal body instead of a spindle that turns relative to the pedal body. A sealed cartridge ball bearing is mounted to the end of a crank arm. The shaft does not turn relative to the pedal body. The pedal shaft rotates relative to the crank arm instead. The shaft is fitted through the sealed cartridge ball bearing of the crank arm and secured in position. The pedal does not require bearings or bushings or seals as with prior art pedals, because the shaft rotates within the sealed cartridge bearing held within the crank arm. The shaft and pedal body can be combined to create an even simpler pedal. This system has a number of advantages over the prior art.

This pedal and crank system allows the pedal to be dramatically simplified. For example, the currently simplest clipless pedal has 13 components total and four sided entry. It also has three dynamic seals and one static seal to keep out contamination from the bearing and bushing. By using this new technology for this pedal, the number of components is reduced to seven parts for the pedal and two extra parts for the crank, and only two dynamic seals (on the sealed cartridge bearing). This contributes to a more durable and reliable pedal, as well as rendering it easier to manufacture. Most other prior art clipless pedals have far more components than 13 and would have an even greater reduction in components by using this new technology. Standard pedals (non-clipless) are similarly simplified using this novel concept.

The pedal and crank system of the present invention has applications from the very inexpensive up through the most expensive and high performance bicycles. For inexpensive bicycles, the pedal can be made with fewer parts. In its most extreme, the pedal could be made in only two parts: a combination shaft/pedal body and a screw (to secure the shaft to the bearing). The crank would have two more parts than a typical crank arm (bearing, retainer), so the total pedal and crank system has only four total components compared to other basic prior art pedals containing from 10 to 30 components.

This pedal and crank system has a fixed shaft that can be stronger and lighter than a spindle. With many prior art clipless pedal designs, the spindle must taper faster than preferred in order to make room for the clipping mechanism and the bearings, bushings, and seals. A fixed shaft, on the other hand, can be designed with more freedom from constraints because there is no need to fit bearings and bushings within the clipping mechanism. In fact, in many cases, the fixed shaft can be made completely hollow to maximize stiffness to weight ratio. The over-all weight of the pedal can decrease 10 to 30% or even more, depending on the pedal design. For example, the weight of the prior art four sided clipless pedal given in the above example would decrease about 20 grams per pedal for an all steel version, which is about 15%. In competitive bicycling, this is an especially large amount.

Sealed cartridge bearings are made in high volume for numerous industrial and consumer applications, and the cost is relatively low and the reliability extremely high. Sealed cartridge ball bearings have high quality seals that can seal out contamination even in the harsh conditions that some bicyclists put their bicycles through. Preferably, a sealed cartridge ball bearing such as a deep groove ball bearing is used at the end of the crank arm in order to provide adequate axial and radial loading. However, there are many other types of bearings that also work well.

For very inexpensive bicycles, it is possible to use non-sealed cartridge bearings, or bushings, in order to save cost. Typically, very inexpensive prior art bicycles have pedals without any seals to protect the bearings. However, for durability reasons, it is preferred to use sealed cartridge bearings, if costs allow.

The pedal and crank system of the present invention is much easier to rebuild than prior art pedals. The rebuild kit could be as little as two new sealed cartridge ball bearings. Rebuilding would include removing the screw to remove the pedal, removing the retainer, and removing the sealed cartridge ball bearing. Reassembly would be the reverse of disassembly. A complete rebuild would take a person with average mechanical skills less than five minutes to rebuild a pair of pedals. Prior art pedals are either not rebuildable, or require a much more complicated procedure, and more time.

The pedal and crank system of the present invention allows the stack height to be reduced because in prior art pedals, the bearings and bushings necessarily increase the stack height. By removing the bearings and bushings from within the pedal body, the stack height can be reduced. Conversely, the pedal height can remain the same and instead be strengthened.

This pedal and crank system does not affect Q-factor. Pedal makers will still have the freedom to move the rider's foot as close to the crank arm as desired, as with most prior art pedals.

BRIEF DESCRIPTION OF THE DRAWINGS

The aforementioned objects and advantages of the present invention, as well as additional objects and advantages thereof will be more fully understood hereinafter, as a result of a detailed description of preferred embodiments thereof, when taken in conjunction with the following drawings in which:

FIG. 3 is a perspective view of a crank arm assembly in accordance with one preferred embodiment of the present invention;

FIG. 4 is a perspective view of a clipless pedal assembly in accordance with the preferred embodiment;

Figures 1, 2:
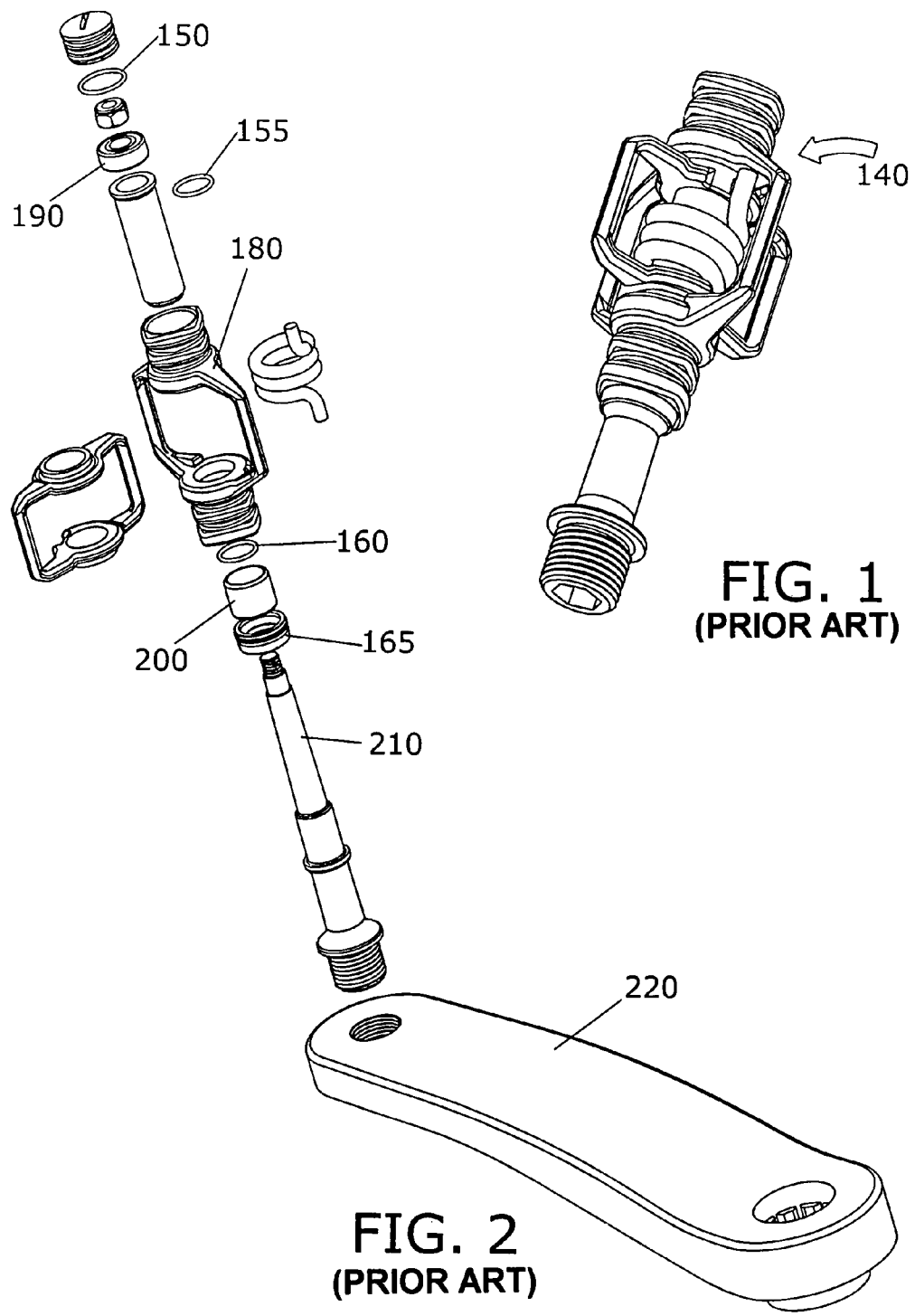
FIG. 1 is a perspective view of a prior art pedal.
FIG. 2 is an exploded perspective view of a prior art crank arm and clipless pedal shown in FIG. 1.

The description herein refers to reference numerals in the accompanying drawings and these reference numerals refer to the parts therein having the following definitions:

| REFERENCE NUMERALS IN DRAWINGS | | | |
|---|---|---|---|
| 10 | clipless bicycle pedal | 20 | crank arm assembly |
| 30 | crank arm | 32 | spline |
| 40 | sealed cartridge ball bearing | 42 | hole |
| 50 | thread ring | 60 | fixed shaft |
| 62 | hole | 64 | boss |
| 80 | wing | 90 | body |
| 100 | sleeve | 110 | screw |
| 120 | spring | 130 | screw |
| 140 | prior art clipless bicycle pedal | 150 | seal |
| 155 | seal | 160 | seal |
| 165 | seal | 180 | body |
| 190 | cartridge ball bearing | 200 | bushing |
| 210 | spindle | 220 | prior art crank arm |
| 230 | crank arm | 232 | hole |
| 240 | retainer ring | 250 | crank arm |
| 252 | hole | 260 | screw |
| 270 | crank arm | 272 | hole |
| 280 | screw | 290 | pedal |
| 300 | body | 302 | body platform |
| 304 | fixed shaft | | |

DETAILED DESCRIPTION OF PREFERRED EMBODIMENT

FIG. 1 shows a relatively simple prior art clipless pedal 140.

FIG. 2 shows the components of the relatively simple prior art clipless pedal 140 shown in FIG. 1. There is one static seal 150 and there are three dynamic seals 155, 160, and 165 necessary to keep contamination away from internal cartridge bearing 190 and bushing 200. Pedal 140 has only 13 components, whereas most clipless pedals have between 15 and 50 components. After spindle 210 is screwed to crank arm 220, body 180 turns in relation to crank arm 220. In other words, after assembly, spindle 210 is effectively fixed to crank arm 220, and body 180 rotates freely on bearing 190 and bushing 200. Prior art pedals, all have some form of body that rotates around a spindle. A fixed shaft in a pedal is believed to be unique.

The present invention may be understood by referring to FIGS. 3–15. By way of example, referring first to FIGS. 3 to 9, it will be seen that the foregoing and other objects are attained, according to the present invention by a pedal 10 with a shaft 60 fixed to the pedal body 90 instead of a spindle that turns relative to the pedal body. A crank arm assembly 20 is comprised of a sealed cartridge ball bearing 40 mounted to the end of a crank arm 30 and held in position by a retainer 50. The shaft 60 does not turn relative to the pedal body 90. The pedal shaft 60 rotates relative to the crank arm 20 instead. The shaft 60 has a boss 64 that is fitted through hole 42 of sealed cartridge ball bearing 40 and a screw 130 secures shaft 60 in position. Pedal shaft 60 rotates relative to crank arm 20 instead of relative to pedal body 90. Pedal 10 does not require bearings or bushings or seals as with prior art pedals, because the shaft rotates within the sealed cartridge bearing 40 held within crank arm 20. The shaft and pedal body can be combined to create an even simpler pedal 290 shown in FIG. 6. This system has a number of advantages over the prior art.

FIG. 3 shows a crank 20 comprised of a crank arm 30, a sealed cartridge ball bearing 40, and a thread ring 50. Bearing 40 has a hole 42. Crank arm 30 has a spline 32 for attachment to a typical bottom bracket (not shown), as is well known in the prior art. A screw and washer (not shown) secure the crank arm 30 to the bottom bracket, as is well known in the prior art. Alternatively, the spline could be of square cross-section or other shapes that key to the bottom bracket spindle, or crank arm 30 could have a bottom bracket spindle as part of the crank arm 30 making it an "integrated" crank, as is well known in the prior art. Integrating a bearing into the end of a crank arm is believed to be unique.

FIG. 4 shows a clipless pedal 10 with a fixed shaft 60 instead of a spindle. Fixed shaft 60 connects to crank arm assembly 20 by fitting boss 64 into hole 42 of crank arm 30. Body 90 does not turn in relation to fixed shaft 60, because fixed shaft 60 can turn in relation to crank arm 30. Pedal 10 is secured to crank arm assembly 20 by a screw 130.

Figure 5:
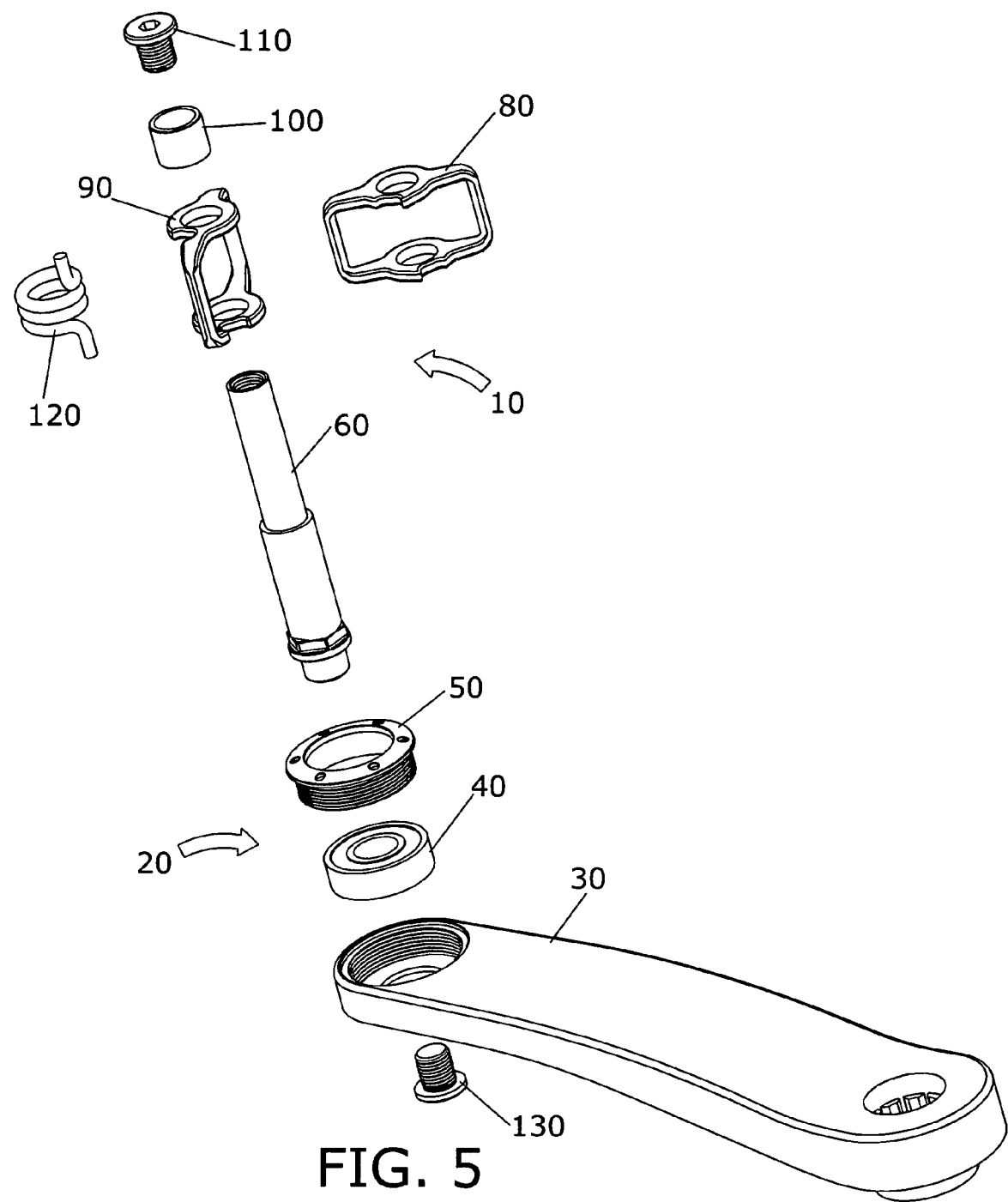
FIG. 5 is an exploded perspective view of the novel crank arm and clipless pedal shown in FIGS. 3 and 4.

FIG. 5 shows the components of crank arm assembly 20 shown in FIG. 3, and clipless pedal 10 shown in FIG. 4. Crank arm assembly 20 is comprised of a crank arm 30, a sealed cartridge ball bearing 40, and a thread ring 50. Pedal 10 is comprised of a fixed shaft 60, a wing 80, a body 90, a sleeve 100, a screw 110, a spring 120, and a screw 130. Note that pedal 10 has only seven components and crank arm assembly 20 has only two components more than typical crank arms. Therefore, effectively, this novel system has only nine total components compared to prior art pedal 140. Pedal 10 retains all the advantages that pedal 140 has over other clipless pedals, yet compared to pedal 140 which has 13 components, pedal 10 weighs less, is more simple and less expensive to manufacture, has a stronger and stiffer structure, is easier and faster to rebuild, is more durable, and has better contamination protection.

Figure 6:
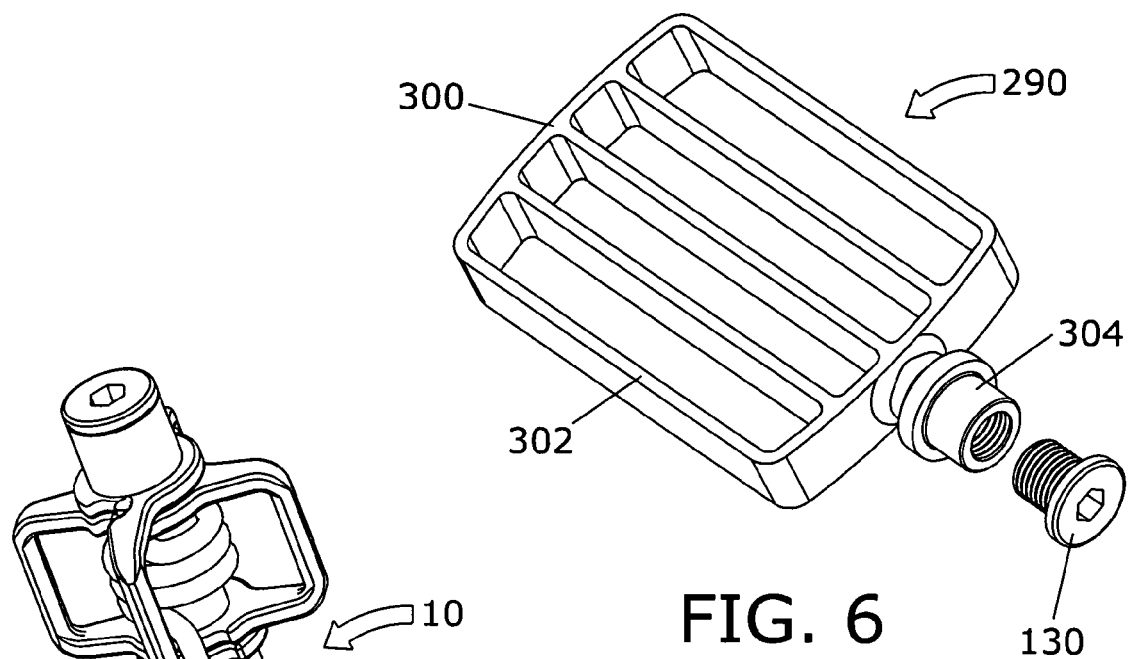
FIG. 6 is a perspective view of a basic pedal in accordance with a second preferred embodiment of the invention.

FIG. 6 shows a basic pedal 290, which, because of the present invention, is more simple than prior art basic pedals. Pedal 290 is comprised of only two components: a pedal body 300 and a screw 130. Pedal body 300 is a one piece construction of a body platform 302 and a shaft 304. Shaft 304 fits into hole 42 of bearing 40 of crank arm assembly 20, and is held in position by screw 130. Pedal body 300 could be made by various manufacturing methods including lost wax casting, forging, die casting, and stamping. When installed, body 300 turns in relation to crank arm 30. Note that pedal 290 has only two components and crank arm assembly 20 has only two components more than typical crank arms. Therefore, effectively, this novel system has only four total components compared to other basic prior art pedals containing from 10 to 30 components. Pedal 290 retains all the advantages basic prior art pedals, yet compared to prior art pedals, pedal 290 weighs less, is more simple and less expensive to manufacture, has a stronger and stiffer structure, is easier and faster to rebuild, is more durable, has better contamination protection, and has a lower stack height.

Figure 7:
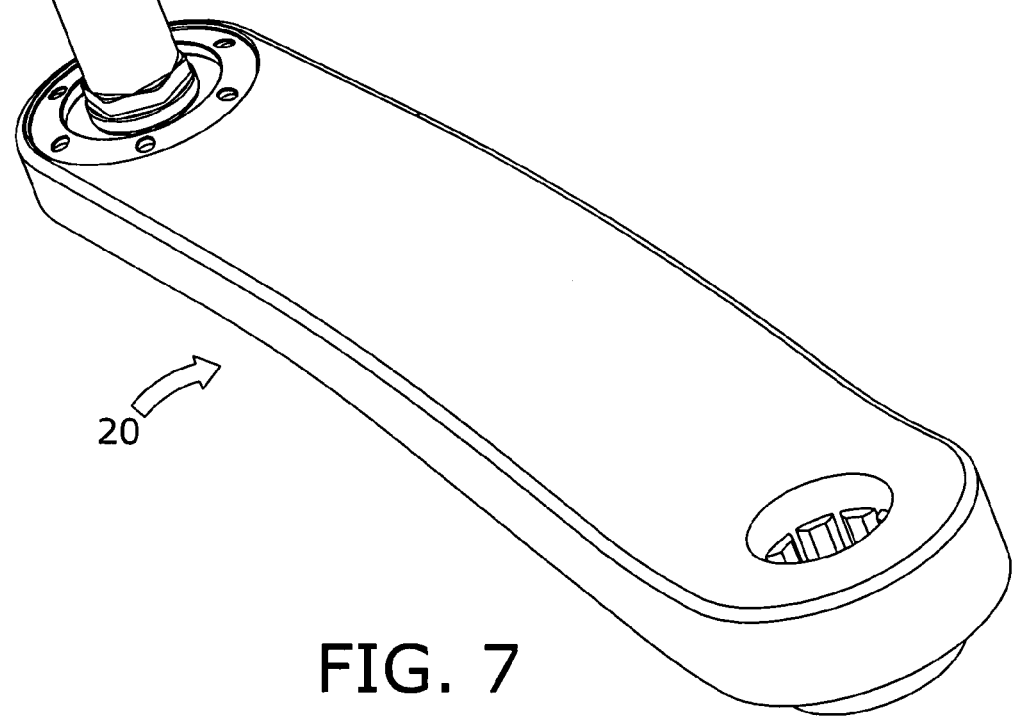
FIG. 7 is a perspective view of the assembled crank arm and pedal shown in FIG. 5.
Figure 8:
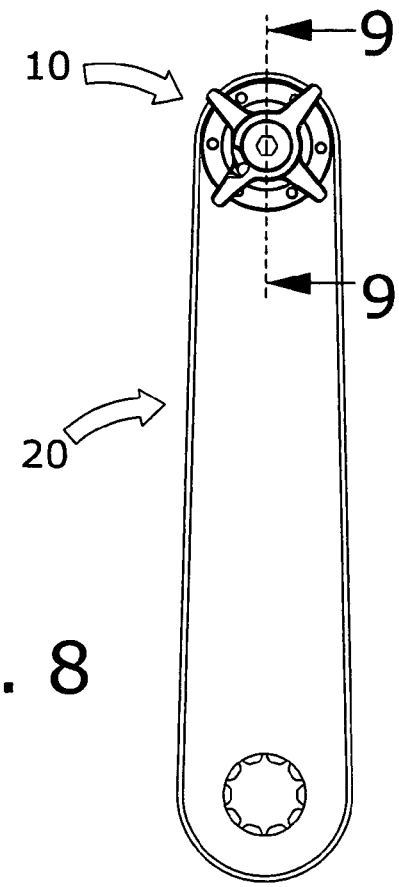
FIG. 8 is a side view of the assembled crank arm and pedal shown in FIG. 7.

FIGS. 7 and 8 show pedal 10 assembled to crank arm assembly 20.

Figure 9:
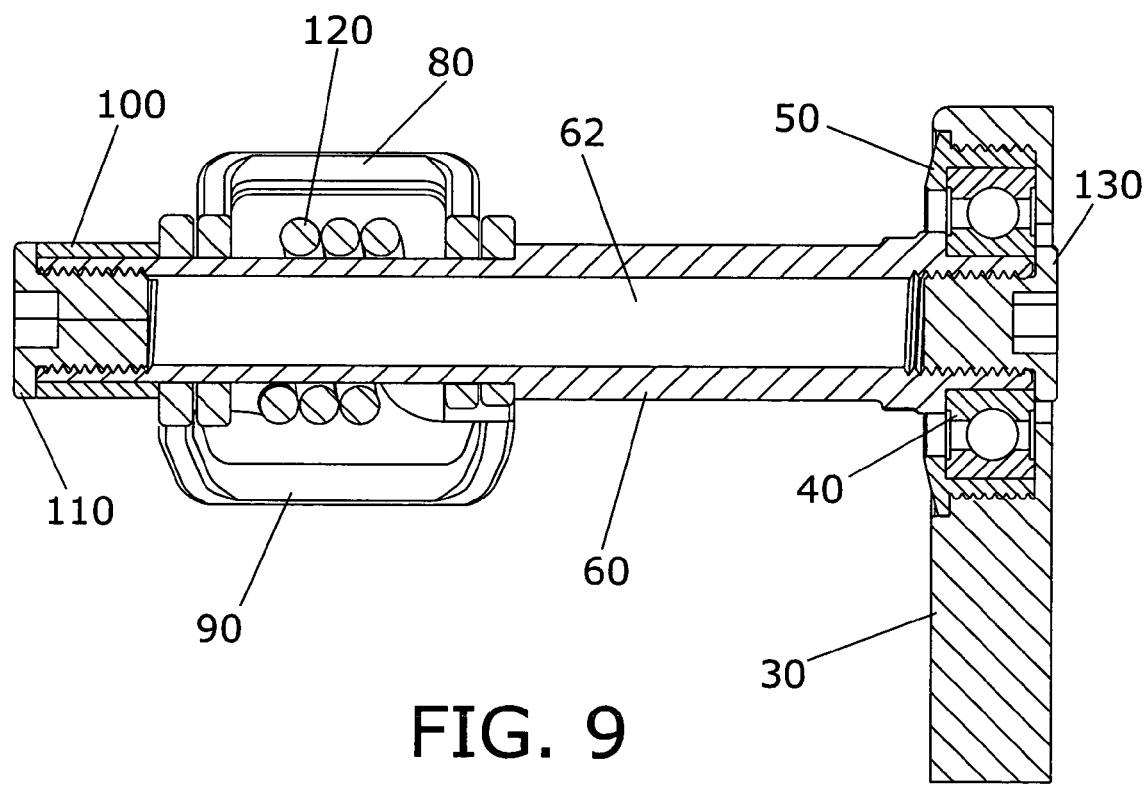
FIG. 9 is a cross sectional view of the pedal and partial cross sectional view of the crank shown in FIG. 8.

FIG. 9 shows a cross section of pedal 10 and crank arm assembly 20 shown in FIG. 8. Thread ring 50 secures sealed cartridge ball bearing 40 to crank arm 30. Screw 130 secures fixed shaft 60 to bearing 40. Spring 120 and wing 80 are placed within body 90 and then slipped over fixed shaft 60. Then sleeve 100 is slipped over shaft 60 and secured by screw 110. Rebuilding the system would only require removing pedal 10 by removing screw 130, then removing thread ring 50, replacing bearing 40, and re-installing thread ring 50. Finally, pedal 10 is re-installed by tightening screw 130.

Figure 10:
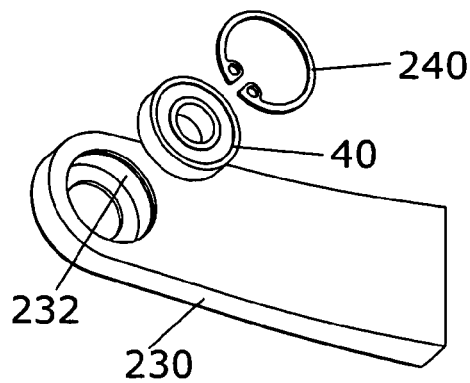
FIG. 10 is an exploded perspective view of an alternative embodiment for securing a cartridge bearing in the end of a crank arm.

FIG. 10 shows an alternative method for securing a sealed cartridge ball bearing 40 in a crank arm. Bearing 40 is press fit into hole 232 of crank arm 230, and then a retainer ring 240 is snapped into position.

Figure 11:
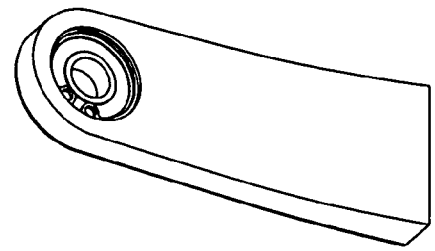
FIG. 11 is a perspective view of the partial crank arm assembly shown in FIG. 10.

FIG. 11 shows the assembled components shown in FIG. 10.

Figure 12:
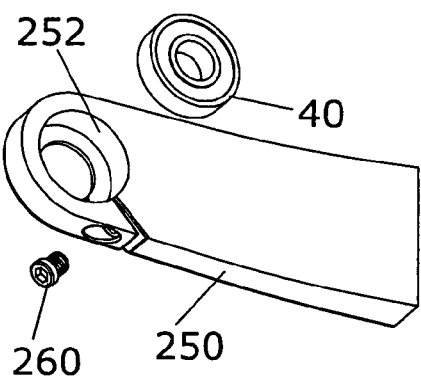
FIG. 12 is an exploded perspective view of another alternative embodiment for securing a cartridge bearing in the end of a crank arm.

FIG. 12 shows an alternative method for securing a sealed cartridge ball bearing 40 in a crank arm. Bearing 40 is fit into hole 252 of crank arm 250, and then a screw 260 is tightened to clamp bearing 40 into position.

Figure 13:
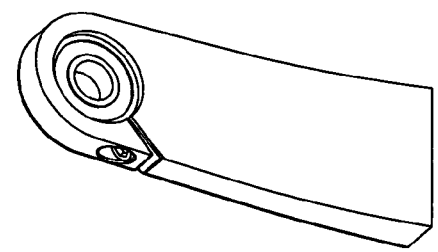
FIG. 13 is a perspective view of the partial crank arm assembly shown in FIG. 12.

FIG. 13 shows the assembled components shown in FIG. 12.

Figure 14:
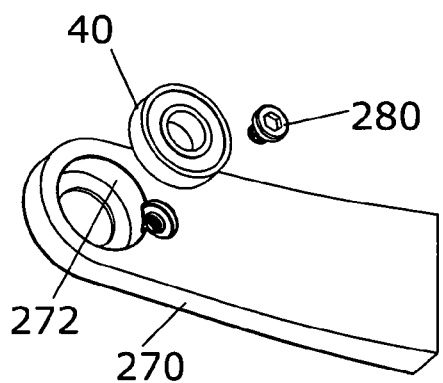
FIG. 14 is an exploded perspective view of still another alternative embodiment for securing a cartridge bearing in the end of a crank arm.

FIG. 14 shows an alternative method for securing a sealed cartridge ball bearing 40 in a crank arm. Bearing 40 is press fit into hole 272 of crank arm 270, and then a screw 280 is tightened to clamp bearing 40 into position.

Figure 15:
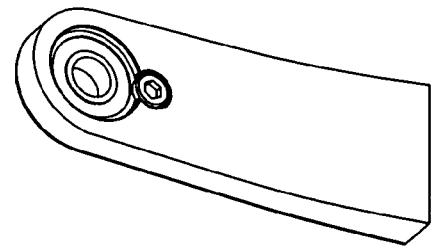
FIG. 15 is a perspective view of the partial crank arm assembly shown in FIG. 14.

FIG. 15 shows the assembled components shown in FIG. 14.

Other Embodiments

Those skilled in the art will readily perceive other embodiments. For example, the sealed cartridge ball bearing 40 could be made without seals, or with pins instead of balls, or with tapered pins instead of balls, or with a double row of balls, or as a bushing. Four methods to secure the bearing 40 to the crank arm have already been described, but there are many other ways to achieve this. For example, the bearing 40 could be simply press fit into the crank arm without the need for a secondary fastener. The bearing 40 could have a thread machined into the outer diameter so that it could be directly threaded into the crank arm. The bearing 40 could be bonded to the crank arm. The crank arm could have a race machined into it, and then ball bearings could be added along with another race.

The basic pedal described has only two components. However, it may be even less expensive to manufacture if the body were made from three pieces: A fixed shaft, a body, and a screw to secure the body to the shaft. In that way, the fixed shaft could be made of a material such as steel, while the body is made using a very inexpensive material and process such as injection molded polypropylene. The fixed shaft could have a flat machined into it so that the shaft would be keyed to the body, because the shaft does not need to turn in relation to the body. The injection molded body could be co-molded directly to the fixed shaft, so that a screw is not necessary to secure the body to the shaft. This embodiment, while not quite as simple as the preferred basic pedal embodiment described, is still much more simple and costs less than prior art basic pedals, and has many of the other advantages previously described.

Almost all pedals on the market today could be simplified and improved by using the teaching disclosed herein. For example, a typical prior art clipless pedal has a clipping mechanism consisting of latches and springs and screws, all attached to a body. The body has a bore into which bearings and seals fit. There is a spindle that fits into the bearings and seals and is secured to the body by a fastener. By using the teaching disclosed herein, all the seals and bearings are eliminated within the body, the spindle (now a fixed shaft) can either be enlarged (and preferably hollowed out) and keyed to the body, or the body can be decreased in thickness (reducing stack height) and keyed to the shaft. The new pedal will have fewer parts, and probably weigh less, cost less, have better contamination protection, be stronger and stiffer, easier to rebuild, more durable, and possibly have a decreased stack height. Any one of these advantages is significant. Combined, these advantages have a profound effect on the bicycle art.

Body 90 of the preferred embodiment has been described as being fixed in relation to shaft 60. For ease of manufacturing, in the preferred embodiment the body is not keyed to the shaft and could, in theory, occasionally rotate slightly. This rotation is not necessary for function. Shaft 60 will have less resistance to turn within bearing 40 than body 90 to turn around shaft 60. Body 90 could easily be press fit or otherwise attached to shaft 60, but this is not necessary for this particular design, and would only increase assembly cost. For other embodiments, it may be desirable to key the shaft to the body to ensure no relative rotation between the shaft and the body.

It will thus be evident that there are many additional embodiments which are not illustrated above but which are clearly within the scope and spirit of the present invention. The above description and drawings are therefore intended to be exemplary only and the scope of the invention is to be limited solely by the appended claims and their equivalents.

The invention claimed is:

1. An improved bicycle pedal and crank arm comprising:
a clipless bicycle pedal having a fixed shaft; and
a unitary crank arm having a fixed length and a rotatable bearing disposed directly therein, said rotatable bearing receiving an end of said fixed shaft in substantially unrestricted rotatable manner independent of crank arm configuration to allow relative rotation between said clipless bicycle pedal and said crank arm.

2. The bicycle pedal and crank arm of claim 1 wherein said pedal and shaft are integrated as a unitary body.

3. An improved bicycle pedal and crank arm comprising:
a bicycle pedal having a fixed shaft; and
a unitary crank arm having a fixed length and a rotatable bearing disposed directly therein, said rotatable bearing receiving an end of said fixed shaft in substantially unrestricted rotatable manner independent of crank arm configuration to allow relative rotation between said pedal and said crank arm; and
wherein said bearing is secured to said crank arm by a retainer.

4. An improved bicycle pedal and crank arm comprising:
a bicycle pedal having a fixed shaft; and
a unitary crank arm having a fixed length and a rotatable bearing disposed directly therein, said rotatable bearing for receiving an end of said fixed shaft in substantially unrestricted rotatable manner independent of crank arm configuration to allow relative rotation between said pedal and said crank arm; and
wherein said bearing is sealed.

5. An improved bicycle pedal and crank arm comprising:
a bicycle pedal having a fixed shaft; and
a unitary crank arm having a fixed length and a rotatable bearing disposed directly therein, said rotatable bearing receiving an end of said fixed shaft in substantially unrestricted rotatable manner independent of crank arm configuration to allow relative rotation between said pedal and said crank arm; and
wherein said bearing is a cartridge bearing.

6. An improved bicycle pedal and crank arm comprising:
a bicycle pedal having a fixed shaft; and
a unitary crank arm having a fixed length and a rotatable bearing disposed directly therein, said rotatable bearing receiving an end of said fixed shaft in substantially unrestricted rotatable manner independent of crank arm configuration to allow relative rotation between said pedal and said crank arm; and
wherein said bearing is a bushing.

7. A bicycle crank arm having one end for rotational attachment to a bicycle frame and having another end for receiving a bicycle pedal; the crank arm comprising a unitary member having a fixed length an aperture receiving directly therein a bearing at said pedal receiving end, said bearing receiving an end of a pedal shaft in substantially unrestricted rotatable manner independent of crank arm configuration for rotation of said shaft in said crank arm; and wherein said bearing is secured to said pedal receiving end by a retainer.

8. A bicycle crank arm having one end for rotational attachment to a bicycle frame and having another end for receiving a bicycle pedal; the crank arm comprising a unitary member having a fixed length and an aperture receiving directly therein a bearing at said pedal receiving end, said bearing receiving an end of a pedal shaft in substantially unrestricted rotatable manner independent of crank arm configuration for rotation of said shaft in said crank arm; and wherein said bearing is sealed.

9. A bicycle crank arm having one end for rotational attachment to a bicycle frame and having another end for receiving a bicycle pedal; the crank arm comprising a unitary member having a fixed length and an aperture receiving directly therein a bearing at said pedal receiving end, said bearing receiving an end of a pedal shaft in substantially unrestricted rotatable manner independent of crank arm configuration for rotation of said shaft in said crank arm; and wherein said bearing is a cartridge bearing.

* * * * *